(12) United States Patent
Damodaran

(10) Patent No.: US 11,526,692 B2
(45) Date of Patent: Dec. 13, 2022

(54) SYSTEMS AND METHODS FOR DOMAIN AGNOSTIC DOCUMENT EXTRACTION WITH ZERO-SHOT TASK TRANSFER

(71) Applicant: UST Global (Singapore) Pte. Ltd., Singapore (SG)

(72) Inventor: Prithiviraj Damodaran, Chennai (IN)

(73) Assignee: UST Global (Singapore) Pte. Ltd., Singapore (SG)

(*) Notice: Subject to any disclaimer, the term of this patent is extended or adjusted under 35 U.S.C. 154(b) by 362 days.

(21) Appl. No.: 16/853,194

(22) Filed: Apr. 20, 2020

(65) Prior Publication Data

US 2021/0264208 A1    Aug. 26, 2021

(30) Foreign Application Priority Data

Feb. 25, 2020    (IN) .............................. 202011007948

(51) Int. Cl.
| | |
|---|---|
| *G06K 9/62* | (2022.01) |
| *G06N 5/04* | (2006.01) |
| *G06N 20/00* | (2019.01) |
| *G06N 5/02* | (2006.01) |
| *G06V 30/416* | (2022.01) |

(52) U.S. Cl.
CPC ............. *G06K 9/6257* (2013.01); *G06N 5/02* (2013.01); *G06N 5/04* (2013.01); *G06N 20/00* (2019.01); *G06V 30/416* (2022.01)

(58) Field of Classification Search
CPC ............. G06F 11/3684; G06F 16/9577; G06F 40/205; G06F 11/3688
See application file for complete search history.

(56) References Cited

U.S. PATENT DOCUMENTS

| | | | | |
|---|---|---|---|---|
| 2009/0083058 A1* | 3/2009 | Beringer | ............... | G06Q 10/067 705/348 |
| 2014/0244668 A1* | 8/2014 | Barrus | ................... | G06F 16/21 707/754 |
| 2016/0098645 A1* | 4/2016 | Sharma | ................. | G06F 16/313 706/12 |
| 2018/0061256 A1* | 3/2018 | Elchik | ................... | G06F 40/131 |
| 2021/0097978 A1* | 4/2021 | Mei | ..................... | G10L 15/1822 |
| 2021/0200954 A1* | 7/2021 | Dsouza | ................. | G06N 3/0445 |
| 2022/0138601 A1* | 5/2022 | Nishida | ................... | G06N 5/04 706/46 |

* cited by examiner

*Primary Examiner* — Hope C Sheffield
(74) *Attorney, Agent, or Firm* — Nixon Peabody LLP; Justin D. Swindells

(57) ABSTRACT

A system for performing document extraction is configured to: (a) receive a first document; (b) extract the first document into document elements, the document elements including pages, lines, paragraphs, or any combination thereof; (c) determine a first set of fields of interest for the first document, wherein the first set of fields of interest are determined via a type of the first document or via a first set of queries for probing the first document; (d) determine, from a plurality of closed domain question answering (CDQA) models, a first set of CDQA models that provides answers to each field of interest included in the first set of fields of interest; and (e) provide answers to the first set of fields of interest to the client device.

20 Claims, 6 Drawing Sheets

SYSTEMS AND METHODS FOR DOMAIN AGNOSTIC DOCUMENT EXTRACTION WITH ZERO-SHOT TASK TRANSFER

PRIORITY CLAIM

This application claims priority to India Provisional Application No. 202011007948, filed Feb. 25, 2020, which is hereby incorporated by reference herein in its entirety.

TECHNICAL FIELD

The present disclosure relates to information extraction from documents and more specifically to systems and methods for extracting information of interest from unfamiliar documents using zero-shot learning.

BACKGROUND

Information extraction involves automatically extracting structured information from either structured or unstructured documents. In some cases, the unstructured documents are human language texts where natural language processing (NLP) is applied to extract the structured information. NLP includes a broad set of computing algorithms for analyzing and representing human language. NLP-based systems have benefited from Deep Learning, enabling applications such as generating machine translations of documents and dialogue generation for automated chat systems or various smart speakers.

Even with the progress in NLP, state of the art approaches to NLP still rely upon traditional machine learning paradigms due to the complex nature of human language. Traditional machine-learning paradigms have certain drawbacks, including, e.g., being computationally costly, requiring a wealth of available training data, requiring a fairly high skill of system engineers, having high energy costs, etc. In addition to these costs and requirements, traditional machine learning paradigms are domain-limited when applied to information (and/or document) extraction. That is, to perform information extraction with an acceptable level of accuracy, traditional machine learning paradigms require training a machine learning model with a text corpus from a specific domain, such that the machine learning model can capture verbiage or tendencies in the specific domain which may not be transferable to other domains. Training can be expensive and prohibitive, as such, the present disclosure provides systems and methods for information extraction that bypasses the extensive training of traditional machine learning paradigms.

SUMMARY

An embodiment of the present disclosure provides a system for performing document extraction. The system includes a non-transitory computer-readable medium storing computer-executable instructions thereon such that when the instructions are executed, the system is configured to: (a) receive a first document; (b) extract the first document into document elements, the document elements including pages, lines, paragraphs, or any combination thereof; (c) determine a first set of fields of interest for the first document, wherein the first set of fields of interest are determined via a type of the first document or via a first set of queries for probing the first document; (d) determine, from a plurality of closed domain question answering (CDQA) models, a first set of CDQA models that provides answers to each field of interest included in the first set of fields of interest; and (e) provide answers to the first set of fields of interest to the client device.

The foregoing and additional aspects and implementations of the present disclosure will be apparent to those of ordinary skill in the art in view of the detailed description of various embodiments and/or implementations, which is made with reference to the drawings, a brief description of which is provided next.

BRIEF DESCRIPTION OF THE DRAWINGS

The foregoing and other advantages of the present disclosure will become apparent upon reading the following detailed description and upon reference to the drawings.

Figure 1:
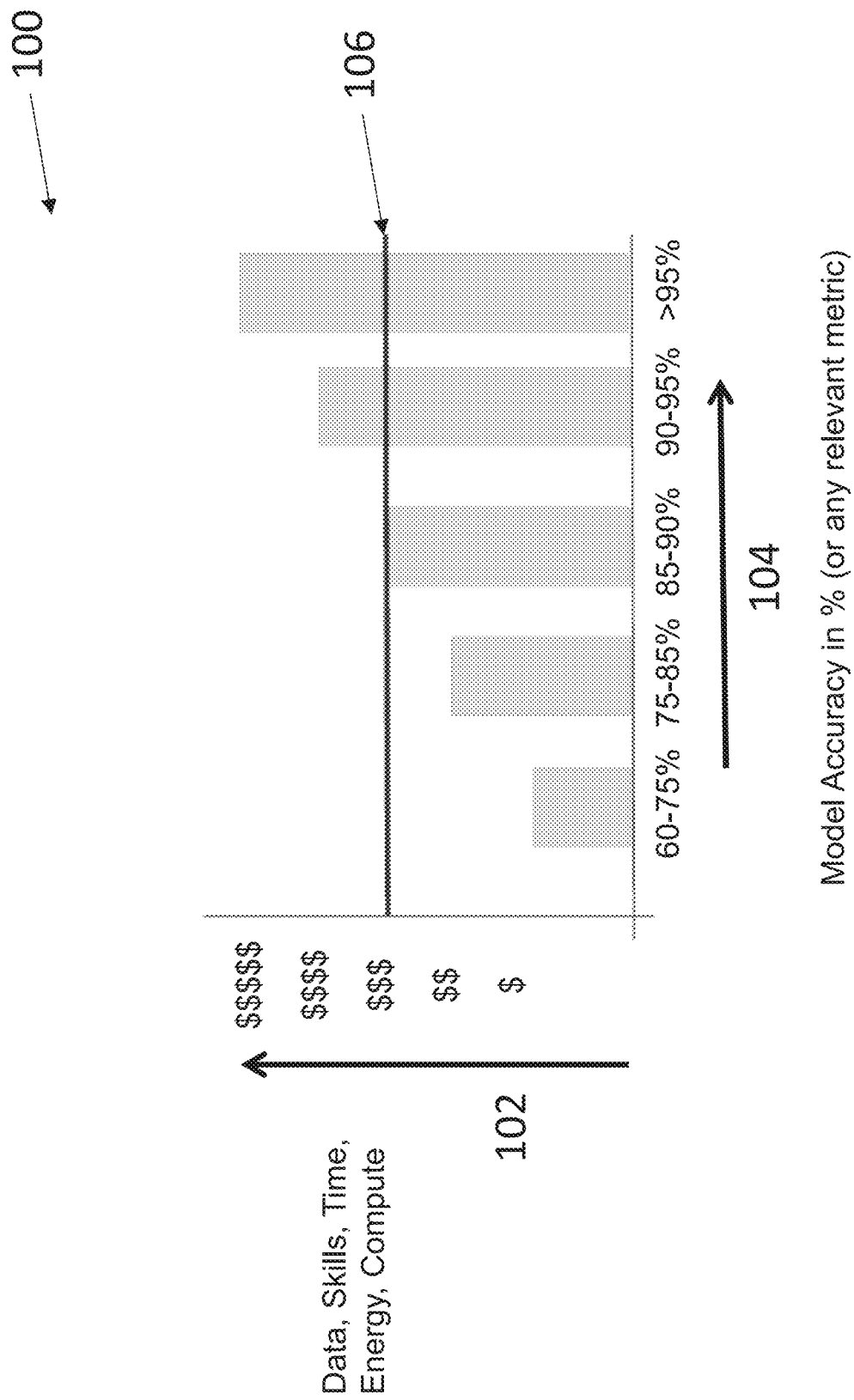
FIG. 1 illustrates a machine learning cost vs model accuracy graph according to some implementations of the present disclosure.

While the present disclosure is susceptible to various modifications and alternative forms, specific implementations have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the present disclosure as defined by the appended claims.

DETAILED DESCRIPTION

Information extraction and document extraction will be used interchangeably throughout since activities involved in information extraction can also apply to document extraction. In document extraction, a document can be prepared prior to information being extracted from the document. For example, a handwritten document can be first preprocessed to recognize words, letters or numbers prior to attributing meaning or extracting meaning from the words, letters or numbers. As such, embodiments of the present disclosure are not merely limited to systems and methods for document extraction but can apply generally to information extraction from any type of source.

Machine learning approaches to information extraction and document understanding can be challenging. FIG. 1 is a graph 100 illustrating a typical progression of a machine learning project. The graph 100 includes an x-axis providing example values of a trained model's accuracy, with item 104 illustrating a direction of increasing model accuracy. The graph 100 also includes a y-axis representing cost, with item 102 illustrating a direction of increasing cost. Cost can be cast in terms of amount of data needed for training a machine learning model to a specific accuracy, a level of skill of software engineer needed for training the model to the specific accuracy, an amount of time involved in training the model to the specific accuracy, an amount of energy consumed in training the model to the specific accuracy, an amount of computation required in training the model to the specific accuracy, etc. As can be seen in the graph 100, cost is positively correlated with model accuracy, therefore, costs increase as model accuracy increases. Cost increases are not only positively correlated to model accuracy, but costs can have an exponential relationship with model accuracy as higher model accuracies are desired. For enterprise solutions, the line 106 provides an example of a cost level where spending any more resources for attaining increased model accuracy is wasteful.

Machine learning approaches to document understanding also present big challenges. For example, machine learning approaches rely upon domain level information extraction, such that, if a generalized information extraction model were sought, then multiple domains have to be considered. For example, if information is to be extracted from an annual report, machine learning approaches train a model using sample annual reports as training data so that the model can recognize documents that look like annual reports. The model, once trained for annual reports, will not be effective at extracting information from other types of documents. Machine learning approaches do not provide a generalized document extraction model. That is, for each domain, there must be data from at least one source to train a document extraction model for that domain. Furthermore, there must be fields of interest that are to be extracted. Each of these requirements compounds the problem equation such that the number of fields to be trained across domains can be expressed as:

$$N = D \times T \times F,$$

where D is the domain, T is the document types, and F are fields sources. As any of the D, T, or F grows, the number of fields to be trained can grow very quickly.

Machine learning approaches to document extraction also present a challenge when trying to sidestep the previously described training problem by combining different machine learning models. For example, a classification model can be used to determine domain, then a named-entity-recognition (NER) model can be used for synonyms of fields of interest, and then a natural language query can be used to extract information pertaining to the fields of interest. Each of the aforementioned models has some associated level of uncertainty. So when each model is successively chained in stages, as described above, the uncertainty or error propagates from one stage to another and can be compounded at each stage. Compounded uncertainty is hard to offset, especially when adequate training data for each of the models is not available.

Embodiments of the present disclosure recognize that uncertainty may not be eliminated, and there may not always be enough data to achieve a desired level of model accuracy when using machine learning paradigms for document extraction. As such, embodiments of the present disclosure utilize an N-shot learning, and more specifically, a zero-shot learning approach to information extraction and document understanding. In zero-shot learning, techniques or models trained for task A are applied to task B without modification or training the model for task B. Thus, some embodiments of the present disclosure perform document extraction without any training. Zero-shot learning is also referred to as zero-shot task transfer.

Embodiments of the present disclosure provide a zero-shot task transfer based domain agnostic information extraction framework. A plurality of closed-domain question answering (CDQA) models are leveraged to achieve domain agnostic document extraction. CDQA models are models trained under a specific domain. The inventors noticed that information extraction when performed using traditional machine learning paradigms introduced the aforementioned drawbacks, and specifically, closed the door to realizing domain agnostic systems. These traditional machine learning paradigms require model training within the domain of interest, and as such are not generalizable to being applied to documents in any type of domain. By reframing the document extraction problem as a CDQA problem, the inventors were able to realize domain agnostic document extraction without the need for training a model in a specific domain.

Figure 2:
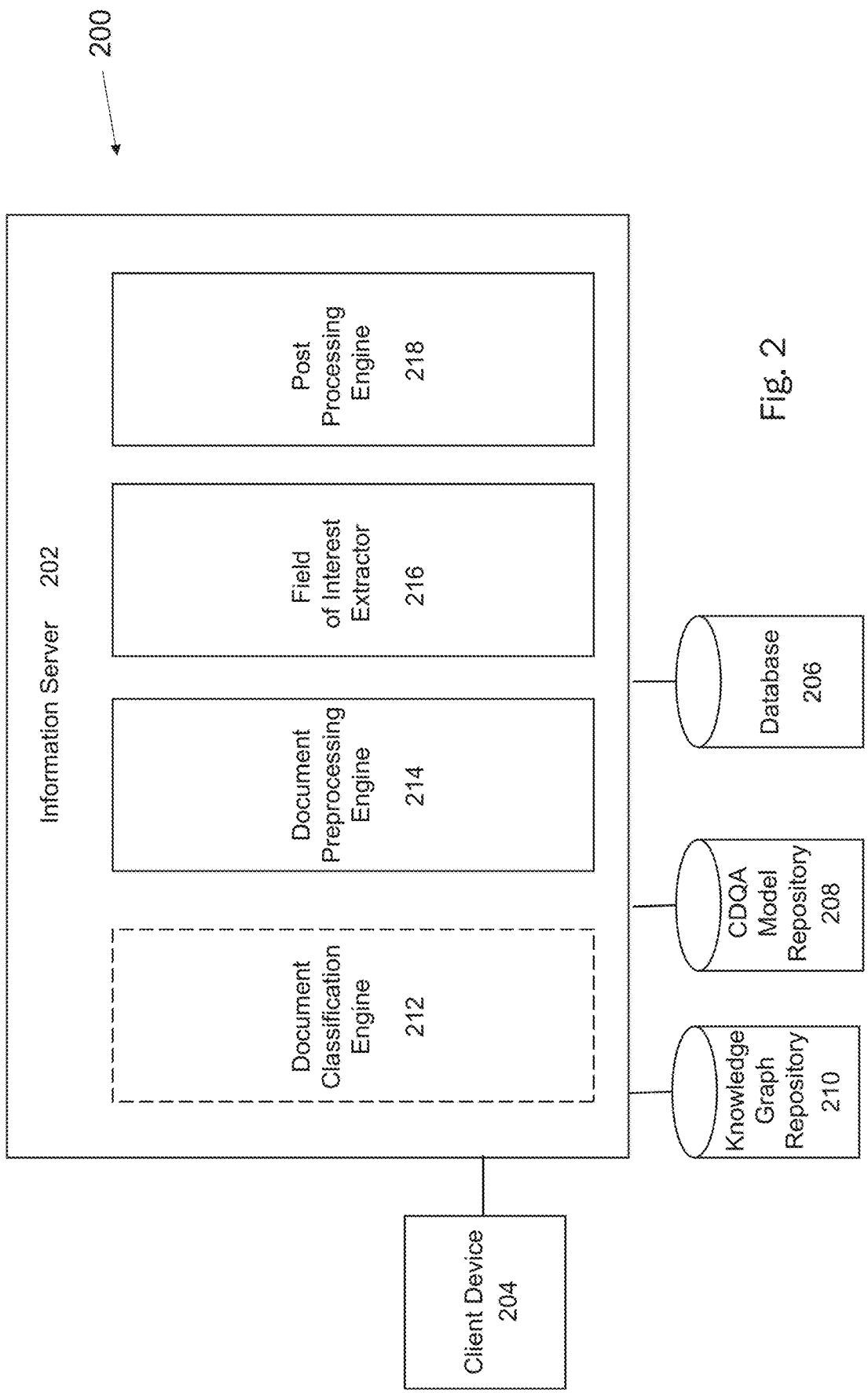
FIG. 2 illustrates a block diagram of a system for document extraction according to some implementations of the present disclosure.

FIG. 2 illustrates a block diagram of a system 200 for performing information extraction according to some implementations of the present disclosure. To simplify discussion, the singular form will be used for components identified in FIG. 2 when appropriate, but the use of the singular does not limit the discussion to only one of each such component. The system 200 includes a client device 204, an information server 202, a knowledge graph repository 210, a CDQA model repository 208, and a database 206. Each of these components can be realized by one or more computer devices and/or networked computer devices. The computer devices include at least one processor with at least one non-transitory computer readable medium.

The client device 204 is any computing device that can provide commands to or that can communicate with the information server 202 to request the information server 202 perform information extraction. The client device 204 can be a laptop computer, a desktop computer, a smartphone, a smart speaker, a smart television, etc.

The system 200 can use the database 206 for storage. Although depicted separately in FIG. 2, the knowledge graph repository 210, the CDQA model repository 208, and the database 206 can all be combined in one repository. The knowledge graph repository 210 stores a knowledge graph used by the system 200 for representing previously processed documents, and the CDQA model repository 208 holds a plurality of CDQA models used by the information server 202 for information extraction or document extraction purposes. The database 206 can store several parameters, settings, or other configuration utilized during document extraction.

The information server 202 can include a document classification engine 212, a document pre-preprocessing engine 214, a field of interest extractor 216, and a post processor 218. An engine is a combination of hardware and software configured to perform specific functionality. The information server 202 is configured to receive instructions from the client device 204 for extracting information from one or more documents. For example, the client device 204 can provide the information server 202 with a copy of a company's annual report, and the information server 202 can analyze the annual report document to extract fields (such as, chief executive officer (CEO), company name, total assets, etc.). In some implementations, the information server 202 does not have to know the type of document being examined. Each of the document classification engine 212, the document processing engine 214, the field of interest extractor 216, and the post processing engine 218 identified in FIG. 2 is a combination of hardware and software configured to perform specific functionality as described in the following paragraphs.

In some implementations, the information server 202 includes the document classification engine 212. The document classification engine 212 is configured to interrogate documents to be examined to determine a category for the documents. The documents can be provided in different file formats. For example, the documents can be provided in text format (e.g., as a text file, as a hypertext markup language file (HTML), etc.), in an image format (e.g., portable network graphics (PNG) format, tagged image file format (TIFF), Silicon Graphics image file (RGB), graphic interchange format (GIF), portable bitmap formats (e.g., PBM, PGM, PPM), Sun raster bitmap image file format (RAST), raster image file formats (e.g., EXR), JPEG, bitmap formats (e.g., BMP, XBM), etc.), in a video format (e.g., WebP file format), or in any other document format (e.g., portable document format (PDF), open document format (ODF), Microsoft® Word document (DOC), Microsoft® Word Open XML format (DOCX), etc.).

The document classifier 212 can include optical character recognition (OCR) for recognizing text in image files. In an example, the document classifier 212 can determine from headers of documents whether a specific document is a financial document, a legal document, a document containing tables, or some other class of documents. In some implementations, the document classifier 212 can co-operate with the field of interest extractor 216 to determine, from probing a document with different CDQA models, a class of the document. For example, a legal document can be provided to the document classifier 212, and the document classifier 212, not knowing that the document is a legal document, can provide the legal document to the field of interest extractor 216. The field of interest extractor 216 can extract fields within the document using different CDQA models and using different document extraction configurations. The document extraction configurations can include extraction configurations for annual reports, invoices, statements of work, master service agreements, etc. The document classification engine 212 can determine that the document extraction configuration that provides highest confidence for fields of interests extracted identifies the class of the document. For example, if the legal document was a master service agreement, then after applying document extraction configurations for invoices, statements of work, annual reports, etc., the system 200 can determine that master service agreement provides a best document match for the legal document. In some implementations, this determination can be based on whether all fields of interests of the document extraction configuration for a master service agreement have answers. In some implementations, this determination can be based on whether, on average, confidence scores of the answers for the fields of interests of the document extraction configuration for the master service agreement is higher than confidence scores for answers for fields of interests of document extraction configurations for other document classes or types.

The document preprocessing engine 214 is configured to extract document elements from the document to be analyzed. Document elements include pages, lines, paragraphs, etc. Document elements can be indexed and stored in the database 208. The document preprocessing engine 214 can also include custom code for normalizing the document to be analyzed to a specific format. For example, headers in the document can be removed, common words like "is", "the", "a", and so on, can be removed. In other examples, images in the document can be discarded. The preprocessed document is stored in the database 206. The document preprocessing engine 214 can expect dates in the document to be of a specific date format. For example, European format for dates usually lists the day before the month, while U.S. date format usually lists the month before the day. The document preprocessing engine 214 is thus configured to prepare the document by ingesting and indexing elements of the document and performing any customization on the document for the purposes of indexing the elements of the document.

The field of interest extractor 216 is configured to extract at least one configured field of interest from the document. For example, if the document is an annual report, a field of interest can be the name of the CEO. As such, the field of interest extractor 216 is configured to probe the preprocessed document to determine the name of the CEO. The field of interest extractor 216 relies upon document extraction configurations for different documents to determine which field of interest to extract from each preprocessed document. That is, the system 200 stores in the database 206 different field configurations for different types of documents such that given a document type, the system 200 extracts only certain fields. Since the preprocessed document is indexed by the document preprocessing engine 214, the field of interest extractor 216 can track indexes of where answers for the fields of interest are located. The indexes thus provide a location of where, within the preprocessed document, the answers are found.

The field of interest extractor 216 utilizes at least two CDQA models when extracting fields from the document. The document elements (e.g., lines, paragraphs, etc.) determined by the document preprocessing engine 214 are candidates for probing with the at least two CDQA models. Examples of CDQA models include Bidirectional Encoder Representations from Transformers (BERT) trained on Stanford Question Answering Dataset (SQuAD), Simple Bi-Directional Attention Flow (BiDAF), ELMo-BiDAF, etc. The field of interest extractor 216 asks questions on the document elements of the preprocessed document using the different CDQA models in order to determine which of the available CDQA models provides a best response for a given question. For example, two fields "CEO" and "Total Liabilities" are of interest to be extracted from an annual report document. The field of interest extractor 216 can ask, of the document elements, values for "CEO" and "Total Liabilities" of each of the at least two CDQA models. Each CDQA model returns a confidence score which can be boosted using various methods. The confidence score can be a guide to determining which CDQA model to trust. The same CDQA model need not return the best answer for both "CEO" and "Total Liabilities" fields.

The post processing engine 218 cleanses the best answers for each field of interest for displaying on the client device 204. The post processing engine 218 can determine a best form for returning the best answers to the client device 204. For example, an internet protocol (IP) address of the client device 204 can indicate that the client device 204 is located in the U.S., as such, the post processing engine 218 provides dates to the client device 204 in a standard format of the locale of the client device 204. As such, the post processing engine 218 can perform date normalization to match dates provided to a given locale.

In some implementations, the post processing engine 218 provides the best answers in statement format to the client device 204 in an email, a chatbox, a voice recording, etc. The post processing engine 218 can use sentence structures, spellings, and vocabularies of the given locale. For example, the post processing engine 218 can prepare the message, "The total liabilities of Company X is 1.5 M dollars." Similarly, the post processing engine 218 can prepare the same message as "The total liabilities of Company X is $1.5 million." Custom scripts can be used to adapt how the post processing engine 218 provides the best answers to the client device 204.

In some implementations, the post processing engine 218 can link different documents together that may be related. For example, in a contracts example, a master service agreement, a statement of work, and an addendum can be preprocessed and elements indexed by the preprocessing engine 214. The field of interest extractor 216 can extract fields like a "First Party" field, a "Second Party" field, and a "Master Service Agreement effective date" field. The post processing engine 218 can link the master service agreement, the statement of work, and the addendum in a knowledge graph if the "First Party" field, the "Second Party" field, and the "Master Service Agreement effective date" field match in the three documents.

The system 200 in FIG. 2 involves the client device 204 asking the information server 202 for specific information contained in one or more documents and receiving the information from the information server 202. As documents are being analyzed by the information server 202, extracted information can be represented as a knowledge graph and stored in the knowledge graph repository 210. No formal training is performed on the documents being analyzed. That is, the field of interest extractor 216 does not have a trained model of an invoice statement, an annual report, a statement of work document, etc. The information server 202 thus runs a generic framework for information extraction using the same available CDQA models stored in the CDQA model repository 208.

Figure 3:
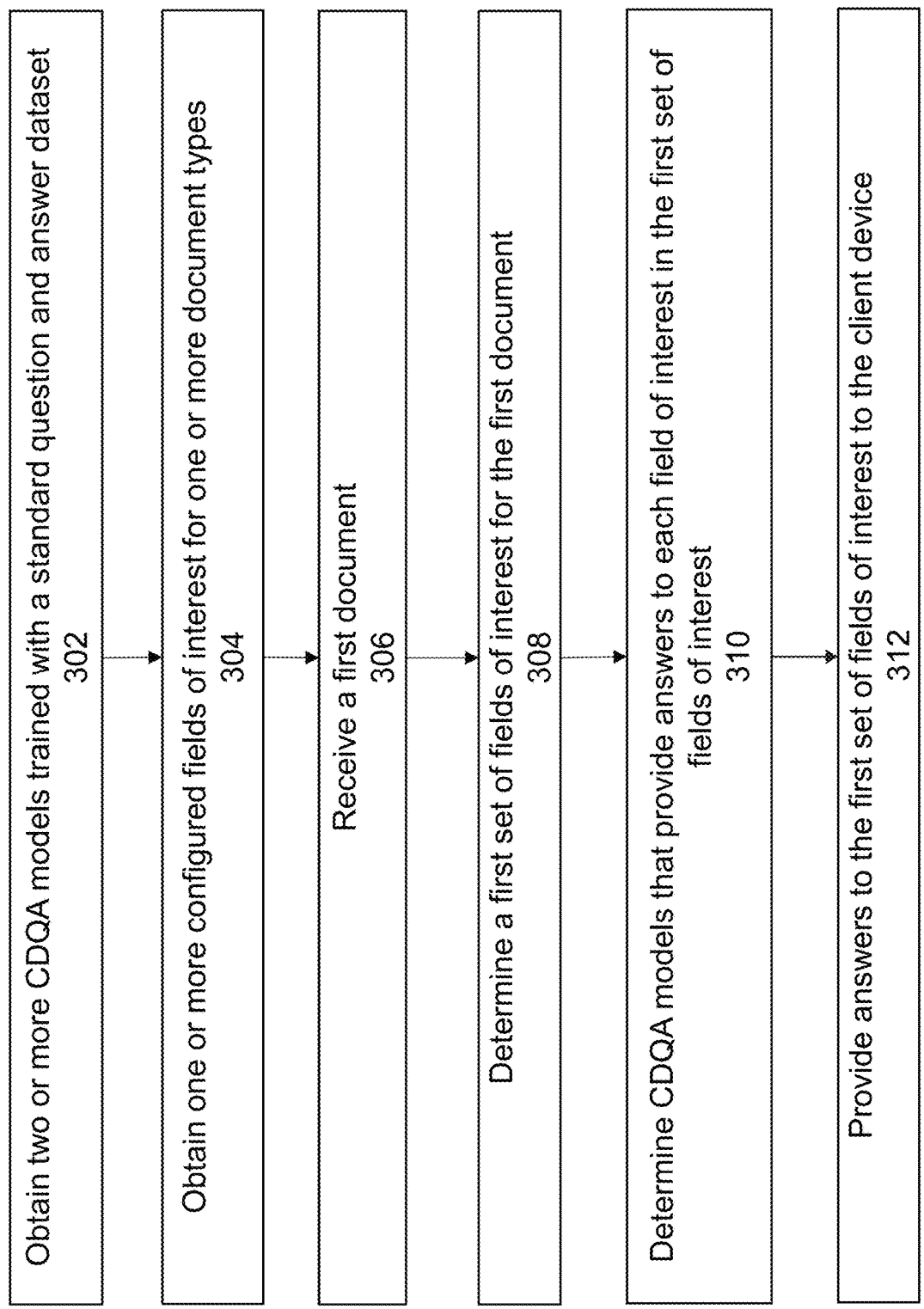
FIG. 3 is a flow diagram showing steps for performing document extraction according to some implementations of the disclosure.

FIG. 3 is a flow diagram showing steps for information extraction according to some implementations of the present disclosure. The steps in FIG. 3 can be implemented by the information server 202. At step 302, the information server 202 obtains two or more CDQA models with a standard question and answer dataset. The information server 202 can merely retrieve the CDQA models from the CDQA model repository 208.

At step 304, the information server 202 obtains one or more configured fields of interest for one or more document types. The fields of interest can be preconfigured and stored in a document extraction configuration. For example, (a) invoices can have a "Late Payment Charges" field, an "Invoice To" field, an "Invoice From" field, an "Invoice Date" field, a "Due Date" field, an "Invoice Number" field, a "Total Amount" field, a "Tax" field, one or more "Line Item" fields, etc.; (b) annual reports can have a "CEO" field, a "Company Name" field, a "Report Year" field, a "Total Assets" field, a "Total Liabilities" field, etc.; (c) statements of work can have a "First Party" field, a "Second Party" field, a "Master Service Agreement effective date" field, a "Statement of Work effective date" field, etc.; and (d) service agreements can have a "First Party" field, a "Second Party" field, a "Master Service Agreement effective date" field, a "Master Service Agreement end date" field, a "Payment Terms" field, a "Volume Rebates" field, etc.

Figure 4:
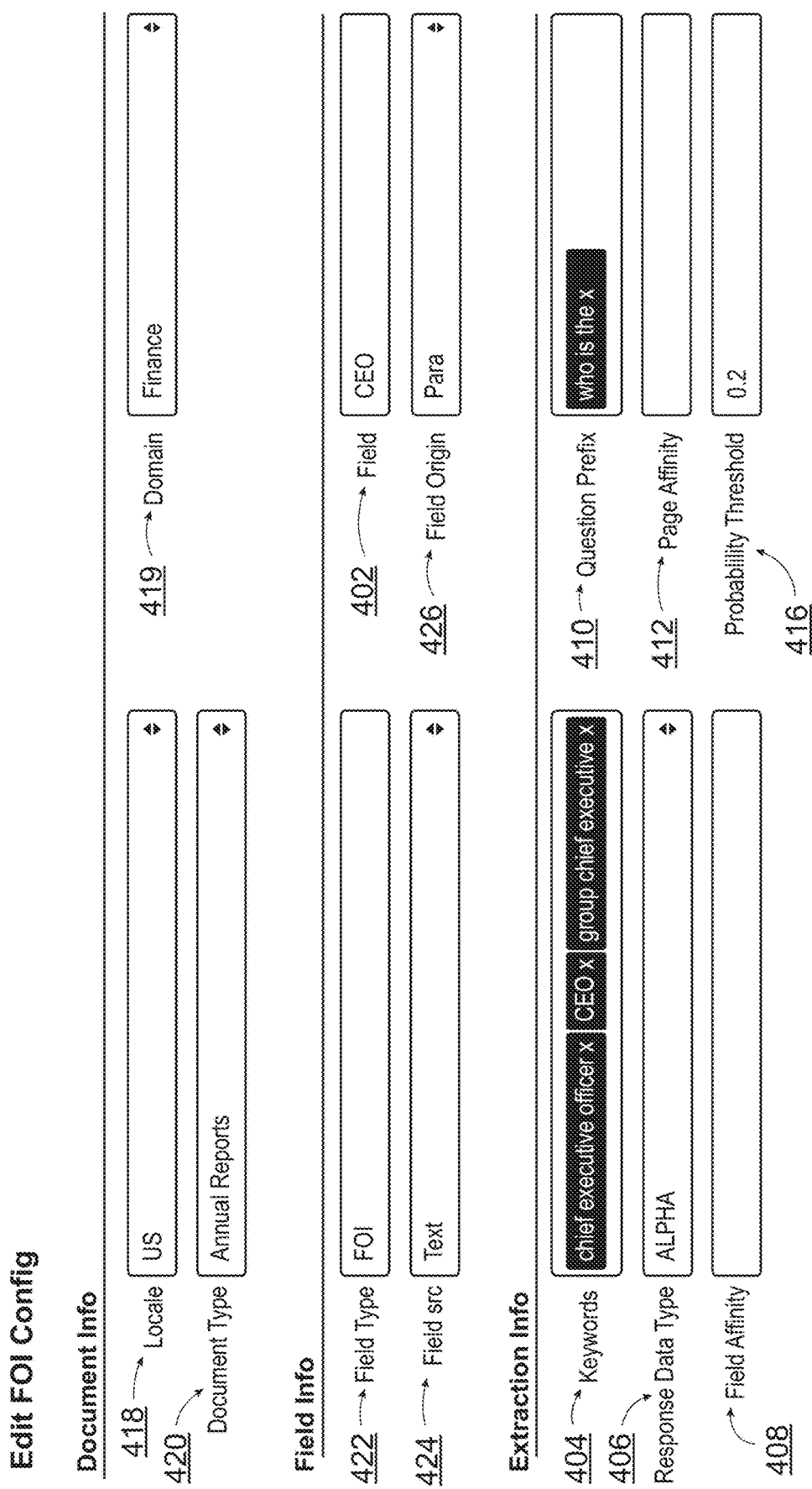
FIG. 4 is an example configuration setup for a field of interest according to some embodiments of the present disclosure.

Fields of interest can have various properties that can be configured as depicted in FIG. 4. For example, "CEO" field of interest configuration in an annual report can be linked to keywords of synonyms which include "chief executive officer", "group chief executive", and "CEO" as shown in item 404. The "CEO" field of interest configuration can also include the field name 402, the field origin 426 of where to look for values for the field, the field source 424 which can be a text source, and the field type 422 which indicates that the CEO field is a field of interest. The field name 402 merely names the field. The field origin 426 can take on values including paragraph, line, page, etc.

In addition, the field configuration can include the response data type 406 which indicates that CEO field should be alphabetic, and a lowest probability threshold 416 can be defined for confidence scores when using CDQA models to extract the CEO field 402. The CEO field can be linked by locale 418, in a specific type of document 420 in a certain domain 419. The response data type 406 can be alphabetic, numeric, or alphanumeric. The lowest probability threshold 416 can be provided as a number less than or equal To 1, e.g., 0.2 as shown in FIG. 4. The locale 418 can describe a geographic region or location, e.g., country, state, continent, etc. The domain 419 describes a knowledge area, e.g., finance, legal, etc.

Additional properties include a page affinity 412 which indicates a page of a document where the field is likely to be found. For example, in a master service agreement document, both contracting parties are usually available as part of a first page of the master service agreement document or on a signature page of the master service agreement document. In the preceding example, the page affinity 412 can bet set to the first page and/or the signature page to indicate that if the field of interests being sought after are the contracting parties, then the information is likely found in these pages. The page affinity 412 provides a customizable framework based on information known about specific document types.

Additional properties include a field affinity 408 which indicates that some fields can be related. For example, in annual reports, a Total Assets field is a different field of interest from a denominations field. The denominations field can be expressed in millions or billions of dollars or some other currency. Since the Total Assets field and the denominations field are usually indicated in different areas of the document (e.g., Total Assets can point to a number in a table while denominations can be expressed in a header or a caption of the table), the field affinity 408 allows the information server 202 to link the Total Assets field that is extracted with the denominations field also extracted.

At step 306, the information server 202 receives a first document. The first document can be received from the client device 204 or from the database 206. The first document is a document to be analyzed by the information server 202 to find values for fields of interest. The first document includes human understandable text. In some implementations, along with receiving the first document, the information server 202 also receives from the client device 204 and/or the database 206 a type of document that describes the first document. For example, the first document can be of the following types: an invoice, an annual report, a statement of work, a service agreement, and so on.

In some implementations, as described above in connection with FIG. 2, the type of document does not need to be provided. The information server 202 can determine what type of document the first document is based on confidence scores and/or whether all fields of interests have an answer, as previously described.

At step 308, the information server 202 can determine a first set of fields of interest for the first document. That is, at step 306, if the information server 202 determines that the first document is of a certain type, then the fields of interest associated with the certain type of document are used as the first set of fields of interest. For example, if the document type is determined to be an annual report, then the first fields of interest can include "CEO", "Total Liabilities", "Total Assets", etc.

At step 310, the information server 202 determines which CDQA models provide answers to each field of interest in the first set of fields of interest. The information server 202 uses the CDQA models to ask specific questions. In some implementations, the questions are based on configurable properties of a field of interest. For example, if the field of interest is "CEO", then a configuration of the field of interest can include "Who is the . . . ?" as a type of question for probing the first document.

In some implementations, each of the CDQA models in the CDQA model repository 208 is used to probe the first document for each field of interest in the first set of fields of interest. CDQA models provide basic confidence scores along with potential answers for each field of interest.

In some implementations, the potential answers for each field of interest is further probed by the field of interest extractor 216 for veracity. For example, a sample potential answer can be probed to determine whether the sample potential answer is a known entity. That is, entity recognition can be performed. For example, company names can be checked against a list of known companies, and depending on the result, the basic confidence score can be boosted. In another example, total liabilities is supposed to return a number, as such, if a CDQA model returns a non-numeric potential answer, then the basic confidence score associated with that non-numeric potential answer is reduced. After evaluating each of the potential answers from the different CDQA models, the answers with the highest confidence scores for each field of interest are determined as the best answers to the first set of fields of interest.

At step 312, the information server 202 provides the best answers to the client device 204. The best answers provided can be curated as previously discussed in connection with the post processing engine 218 of FIG. 2. For example, the best answers can be provided in sentence format, in a tabular format, in a list format, etc.

Figure 5:
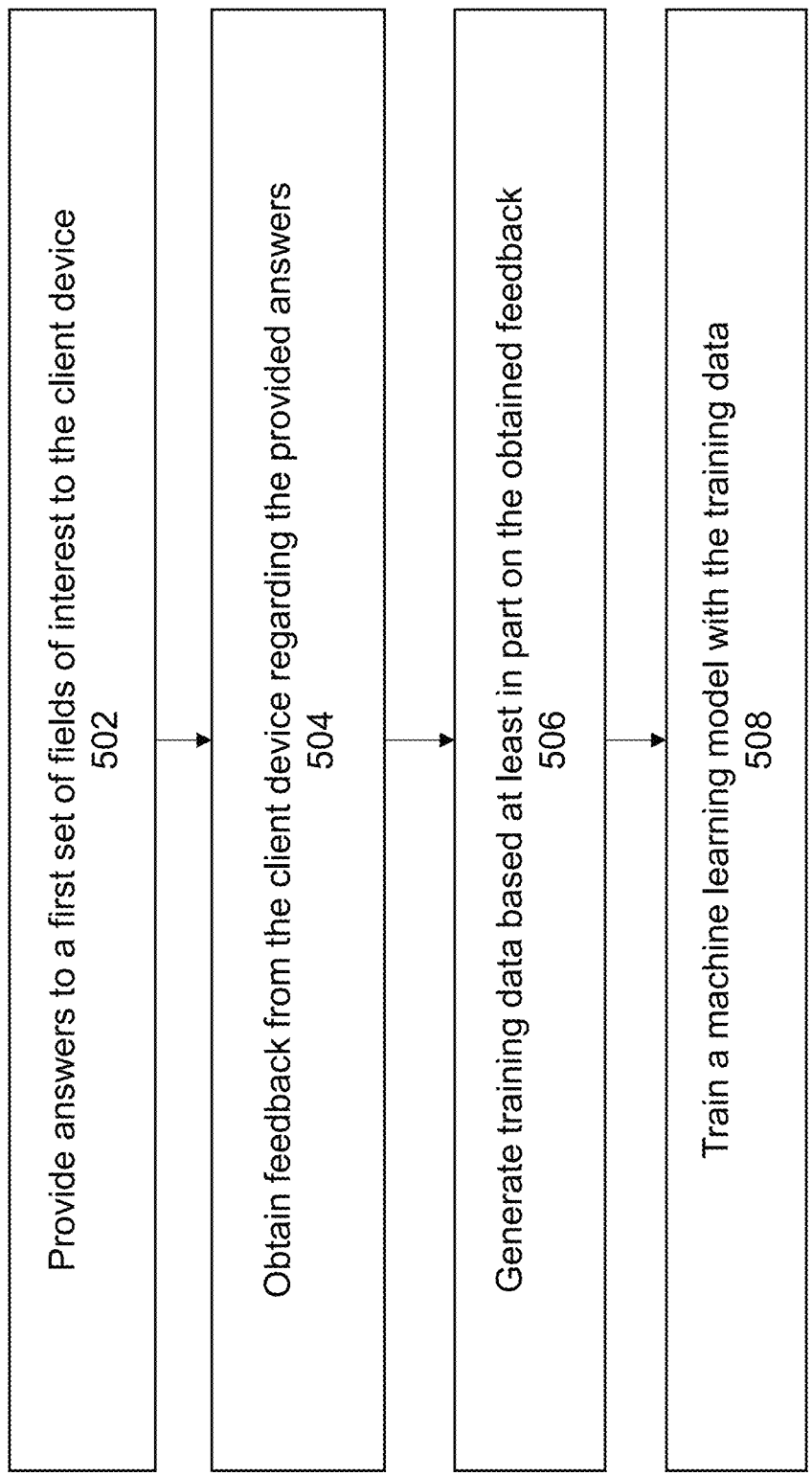
FIG. 5 is a flow diagram showing steps for improving answers over time according to some implementations of the present disclosure.

FIG. 5 is a flow diagram showing steps for improving answers over time according to some embodiments of the present disclosure. The steps in FIG. 5 can be implemented by the information server 202. At step 502, the information server 202 provides answers to a first set of fields of interest to the client device 204. Step 502 is similar to or the same as step 312 previously described in connection with FIG. 3.

At step 504, the information server 202 obtains feedback from the client device 204 regarding the provided answers. The feedback from the client device 204 can be a human in the loop feedback which indicates that an answer in the provided answers is correct, that an answer in the provided answers is incorrect, or both. In some implementations, the feedback from the client device 204 can provided a correct answer for any answer indicated as being incorrect.

Figure 6:
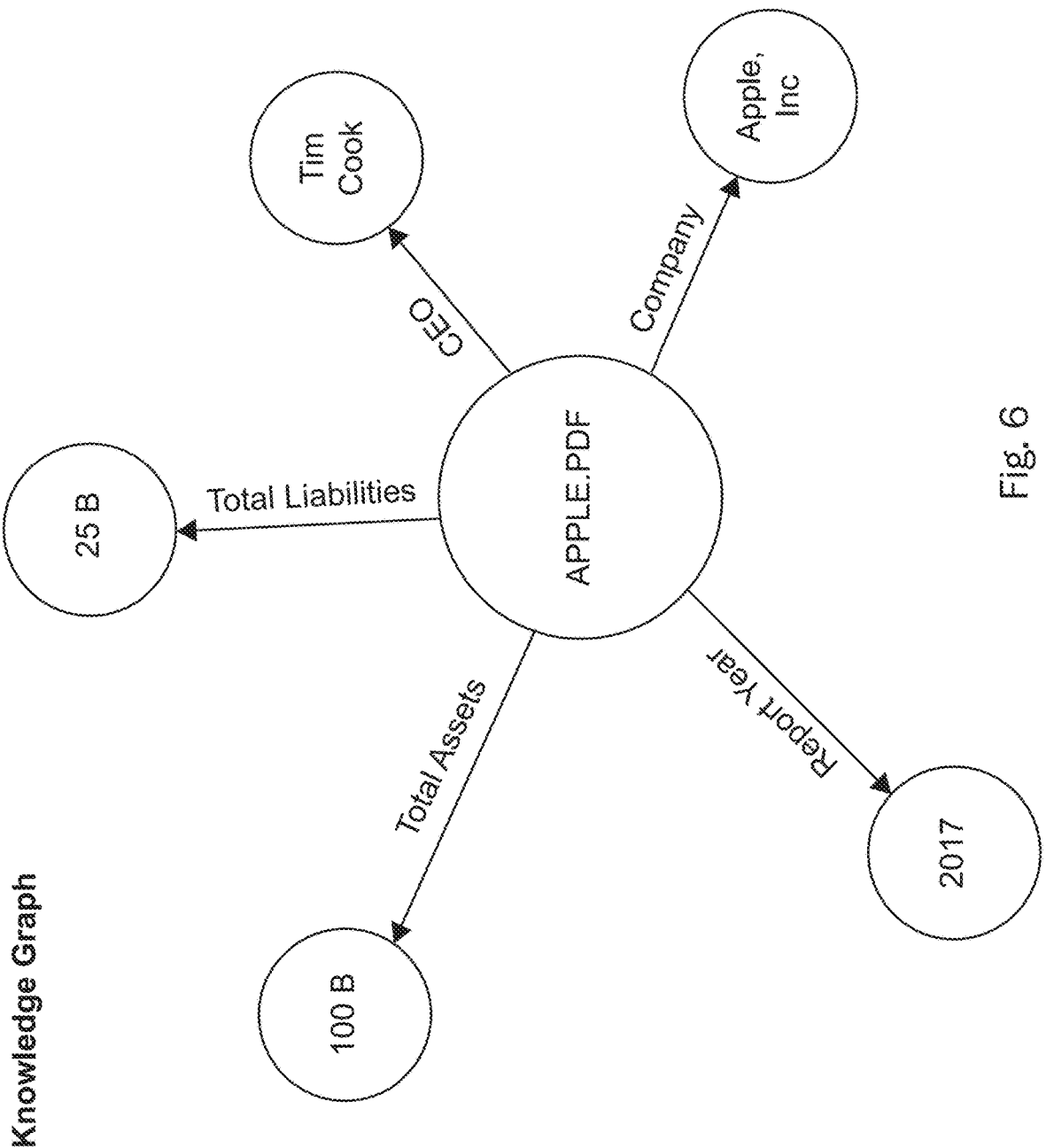
FIG. 6 illustrates a knowledge graph structure according to some implementations of the present disclosure.

At step 506, the information server 202 generates training data based at least in part on the obtained feedback from step 504. A knowledge graph (e.g., the knowledge graph in FIG. 6) can store relationships between a document and fields of interest extracted from the document. The knowledge graph is used to autogenerate the training data for a document specific model.

In some implementations, the training data can be generated as follows. The knowledge graph already has all the fields extracted by the information server 202. The extracted fields stored in the knowledge graph can include both correct and incorrect answers. A user can review the answers via the client device 204, fixing the incorrect answers (and/or partially extracted answers) for the extracted fields. Once this process is completed, the information server 202 has access to the corrected knowledge graph and raw text from the document. For example, if the document were an Invoice document, the information server 202 has the corrected knowledge graph with answers to the fields of interest and raw text of the Invoice document. The information server 202 can use the raw Invoice text, fields of interest for the Invoice document, and respective answers to the fields of interest to generate data for a classic named entity recognition (NER) model.

Training data for a classic NER model can have entities within text identified by indices as well as label. For example, in the text "Spotify steps up Asia expansion", "Spotify" is an entity that can be identified with (1) a start index of 0 and an end index of 8 indicating that "Spotify" is located at the beginning of the sentence and takes up seven characters, and (2) a label of "ORG" indicating that "Spotify" is a company, agency, institution, etc. Also, in the text "Spotify steps up in Asia expansion", "Asia" is an entity that can be identified with (1) a start index of 17 and an end index of 21, and (2) a label of "NORP" indicating that "Asia" is a nationality, religion, or political group. Similarly with the example provided above, raw text of the document, fields of interest within the document, answers for the fields of interest within the document, and position of the answers within the document can be used as training data for the classic NER model.

In some implementations, instead of a classic NER model, semantic slot filling model can be used to generate the training data. In semantic slot filling, words in a text are tagged. For example, given the text "Play with or without you by U2", semantic slot filling can tag words in the text as: {Play, O}, {with, B-song}, {or, I-song}, {without, I-song}, {you, I-song}, {by, O}, and {U2, B-artist}. Similarly, raw text of the document, fields of interest within the document, answers for the fields of interest within the document, and position of the answers within the document can be used as training data for a semantic slot filling model such that tags (i.e., fields of interest) can be predicted for words found in raw text.

At step 508, the information server 202 trains a machine learning model with the training data. The machine learning model trained can be used to augment the zero-task transfer procedure discussed in connection with FIG. 3.

FIG. 5 provides a flow diagram where a human can validate edge cases and correct values as necessary. That way, some embodiments of the disclosure as described in connection with FIG. 3 can use zero-shot learning to generate answers, and a human can validate those answers. The knowledge graph repository 210 stores extracted entities in a knowledge graph (e.g., the knowledge graph shown in FIG. 6). Embodiments of the disclosure can start with zero-shot learning and beat a need for training data, thus achieving domain agnostic document extraction. Later on, time and effort expended with received feedback from a human can be stored in the knowledge graph and used to generate training data for developing document specific models. By combining the processes of FIGS. 3 and 5, validation man-hours expended can be captured and reused to make the system 200 eventually perform better.

Embodiments of the present disclosure provide systems and methods for domain agnostic document extraction. Documents provided to some embodiments can be printed documents, handwritten documents, or a combination of both printed and handwritten documents. The documents can include multiple languages. The documents can contain texts, tables, etc. Embodiments of the disclosure can extract information from the text fields, information from the tables, or both. Embodiments of the disclosure can link fields together based on a field affinity configuration.

While the present disclosure has been described with reference to one or more particular implementations, those skilled in the art will recognize that many changes may be made thereto without departing from the spirit and scope of the present disclosure. Each of these embodiments and implementations and obvious variations thereof is contemplated as falling within the spirit and scope of the present disclosure, which is set forth in the claims that follow.

What is claimed is:

1. A system for performing document extraction, the system including a non-transitory computer-readable medium storing computer-executable instructions thereon such that when the instructions are executed, the system is configured to:
   receive a first document;
   extract the first document into document elements, the document elements including pages, lines, paragraphs, or any combination thereof;
   determine a first set of fields of interest for the first document, wherein the first set of fields of interest are determined via a type of the first document or via a first set of queries for probing the first document;
   determine, from a plurality of closed domain question answering (CDQA) models, a first set of CDQA models that provides answers to each field of interest included in the first set of fields of interest; and
   provide answers to the first set of fields of interest to the client device.

2. The system of claim 1, wherein the answers to the first set of fields of interest are stored in a knowledge graph.

3. The system of claim 1, wherein the type of the first document includes an invoice statement, an annual report, a statement of work, a master service agreement, or any combination thereof.

4. The system of claim 3, wherein a respective field of interest in the first set of fields of interest is configurable via a graphical user interface with at least one configurable option indicating that the respective field of interest is alphabetic, numeric, or alphanumeric.

5. The system of claim 1, wherein the first set of CDQA models includes at least two CDQA models selected from the group consisting of: Bidirectional Encoder Representations from Transformers (BERT) trained on Stanford Question Answering Dataset (SQuAD), Simple Bi-Directional Attention Flow (BiDAF), ELMo-BIDAF.

6. The system of claim 1, wherein the answers to the first set of fields of interest include dates, and the system is further configured to normalize the dates to a locale of the client device.

7. The system of claim 1, further configured to provide a first set of indexes to the client device, wherein a respective answer in the answers to the first set of fields of interest is contained in one of the document elements referenced by a respective index in the first set of indexes.

8. The system of claim 1, further configured to:
   receive a second document;
   extract the second document into document elements;
   determine a second set of fields of interest for the second document, wherein the second set of fields of interest are determined via a type of the second document or via a second set of queries for probing the second document;
   determine, from the plurality of CDQA models, a second set of CDQA models that provides answers to each field of interest included in the second set of fields of interest; and
   based at least in part on the first set of fields of interest for the first document and the second set of fields of interest for the second document sharing common answers for common fields, linking answers to the second set of fields of interest and the answers to the first set of fields of interest in a knowledge graph.

9. The system of claim 8, wherein the first document is a master service agreement and the second document is a statement of work.

10. The system of claim 9, wherein the common fields include a First Party field, a Second Party field, and a Master Service Agreement effective date field.

11. The system of claim 1, further configured to:
    store the answers to the first set of fields of interest in a knowledge graph;
    receive corrected answers from the client device; and
    replace, in the knowledge graph, at least one of the answers to the first set of fields of interest with the corrected answers.

12. The system of claim 11, further configured to:
    generate training data based at least in part on the corrected answers; and
    train a machine learning model with the training data, the trained machine learning model being a document specific model for extracting documents of the type of the first document.

13. The system of claim 12, wherein the machine learning model is a named entity recognition model or a semantic slot filling model.

14. The system of claim 1, wherein the first set of CDQA models includes a first CDQA model and a second CDQA model different from the first CDQA model, wherein the provided answers to the first set of fields of interest include a first answer from the first CDQA model and a second answer from the second CDQA model, the first answer and the second answer directed at different fields of interest in the first set of fields of interest.

15. The system of claim 14, wherein the first CDQA model is Bidirectional Encoder Representations from Transformers (BERT) trained on Stanford Question Answering Dataset (SQuAD) and the second CDQA model is Simple Bi-Directional Attention Flow (BiDAF).

16. The system of claim 3, wherein a respective field of interest in the first set of fields of interest is configurable via a graphical user interface with at least one configurable option indicating a page affinity.

17. The system of claim 3, wherein a respective field of interest in the first set of fields of interest is configurable via a graphical user interface with at least one configurable option indicating a type of question for probing to obtain a respective answer for the respective field of interest.

18. The system of claim 1, wherein the answers to the first set of fields of interest are provided in an email, a chatbox, or a voice recording.

19. The system of claim 1, wherein the answers to the first set of fields of interest are provided in sentence format based on grammar rules for a given locale.

20. The system of claim 1, wherein the first set of fields of interest is preconfigured, and the determine the first set of fields of interest for the first document includes retrieving the first set of fields of interest from a document extraction configuration file.

* * * * *